(12) United States Patent
Toebes et al.

(10) Patent No.: US 9,047,367 B2
(45) Date of Patent: *Jun. 2, 2015

(54) SOCIALLY COLLABORATIVE FILTERING

(71) Applicant: Cisco Technology, Inc., San Jose, CA (US)

(72) Inventors: John Toebes, Cary, NC (US); Ari Daniel Scheinman, San Mateo, CA (US); Eric Chan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,579

(22) Filed: Sep. 13, 2013

(65) Prior Publication Data

US 2014/0081997 A1    Mar. 20, 2014

Related U.S. Application Data

(63) Continuation of application No. 11/947,298, filed on Nov. 29, 2007, now Pat. No. 8,566,884.

(51) Int. Cl.
| | |
|---|---|
| *G06F 17/30* | (2006.01) |
| *G06Q 10/00* | (2012.01) |
| *G06Q 30/06* | (2012.01) |

(52) U.S. Cl.
CPC .......... *G06F 17/30699* (2013.01); *G06Q 10/00* (2013.01); *G06Q 30/06* (2013.01)

(58) Field of Classification Search
CPC ... G06Q 30/02; G06Q 30/0631; G06Q 50/01; G06Q 10/063114; G06Q 30/0269; G06Q 30/0633; G06Q 30/0635; G06Q 30/0643; H04L 67/306; H04L 29/08936; H04L 67/22; G06F 17/30699; G06F 17/30867; G06F 17/30528; H04N 21/44222; H04N 21/4667; H04N 21/252; H04N 21/25891; H04N 21/4532

USPC ............ 709/203, 204, 217; 725/87; 707/752, 707/758
See application file for complete search history.

(56) References Cited

U.S. PATENT DOCUMENTS

| | | | | |
|---|---|---|---|---|
| 5,918,014 | A | | 6/1999 | Robinson |
| 5,933,827 | A | * | 8/1999 | Cole et al. .............................. 1/1 |

(Continued)

FOREIGN PATENT DOCUMENTS

| | | |
|---|---|---|
| EP | 1288795 A1 | 3/2003 |
| WO | 2005055102 | 6/2005 |

(Continued)

OTHER PUBLICATIONS

"My Best Segments", [online] Jun. 16, 2007, [retrieved Jan. 28, 2008]. Retrieved from the Internet: <URL: http://web.archive.org/web/20070616140103/http://www.claritas.com/MyBestSegments/Default.jsp>, pp. 1-2.

(Continued)

*Primary Examiner* — Brian T Pendleton
*Assistant Examiner* — Alan Luong
(74) *Attorney, Agent, or Firm* — Leon R. Turkevich

(57) ABSTRACT

In one embodiment, a method comprises identifying user selection preferences of an identified user having accessed the network, the identifying based on an accumulation of user selection inputs executed by the identified user, relative to input options presented to the user and identifying respective available network items, the accumulation including an identification of the input options not having been selected by the identified user; determining a group of network users having a highest correlation of shared interests with the identified user, based on identifying preferred network items for the identified user, and identifying first network users providing highest relative user affinity values for each of the preferred network items; and determining at least one of new network items most likely to be preferred by the identified user, based on determining, from among network items not presented to the identifier user, the preferred network items for each of the first network users in the group.

20 Claims, 8 Drawing Sheets

(56) References Cited

U.S. PATENT DOCUMENTS

| | | | |
|---|---|---|---|
| 6,064,980 | A | 5/2000 | Jacobi et al. |
| 6,088,722 | A | 7/2000 | Herz et al. |
| 6,681,247 | B1 | 1/2004 | Payton |
| 6,697,800 | B1 | 2/2004 | Jannink et al. |
| 7,343,365 | B2 | 3/2008 | Farnham et al. |
| 7,827,176 | B2 | 11/2010 | Korte et al. |
| 8,392,503 | B2 | 3/2013 | Kuhlke |
| 8,566,884 | B2 | 10/2013 | Toebes et al. |
| 2002/0065802 | A1 | 5/2002 | Uchiyama |
| 2002/0178257 | A1 | 11/2002 | Cerrato |
| 2003/0105681 | A1 | 6/2003 | Oddo |
| 2003/0106057 | A1 | 6/2003 | Perdon |
| 2004/0025174 | A1 | 2/2004 | Cerrato |
| 2004/0267388 | A1 | 12/2004 | Perdon |
| 2005/0204276 | A1* | 9/2005 | Hosea et al. ............... 715/501.1 |
| 2007/0005437 | A1 | 1/2007 | Stoppelman |
| 2007/0094208 | A1 | 4/2007 | Cerrato |
| 2007/0124296 | A1 | 5/2007 | Toebes |
| 2007/0124698 | A1 | 5/2007 | Majumder |
| 2007/0203872 | A1* | 8/2007 | Flinn et al. ....................... 706/62 |
| 2007/0214097 | A1 | 9/2007 | Parsons et al. |
| 2007/0239554 | A1 | 10/2007 | Lin et al. |
| 2007/0250500 | A1 | 10/2007 | Ismalon |
| 2008/0139112 | A1 | 6/2008 | Sampath et al. |
| 2009/0055385 | A1 | 2/2009 | Jeon et al. |

FOREIGN PATENT DOCUMENTS

| | | |
|---|---|---|
| WO | 2007058723 | 5/2007 |
| WO | 2007063162 A1 | 6/2007 |

OTHER PUBLICATIONS

Wikipedia, "Collaborative filtering", [online], (Sep. 28, 2007) [retrieved Oct. 11, 2007]. Retrieved from the Internet: <URL: http://en.wikipedia.org/w/index.php?title=Collaborative_filtering&printable=yes>, pp. 1-6.

Hirschorn, "The Digital-Music Mosh Pit", [online], The Atlantic.com (Jan. 2007) [retrieved Jan. 28, 2008]. Retrieved from the Internet: <URL: http://www.theatlantic.com/doc/200701/hirschorn-radio>, pp. 1-4.

"Digital Interactive Video Exploration & Reflection (DIVER)'", [online], Stanford University (Jan. 12, 2007) [retrieved Jan. 28, 2008]. Retrieved from the Internet: <URL: http://web.archive.org/web/20070112195110/http://diver.stanford.edu/>, 1 page.

"Digital Interactive Video Exploration & Reflection (DIVER)—Overview", [online], Stanford University (Feb. 8, 2007) [retrieved Jan. 28, 2008]. Retrieved from the Internet: <URL: http://web.archive.org/web/20070208005206/diver.stanford.edu/what.html>, 1 page.

"Digital Interactive Video Exploration & Reflection (DIVER)—Overview of Diver system (panoramic capture)", [online], Stanford University (Feb. 8, 2007) [retrieved Jan. 28, 2008]. Retrieved from the Internet: <URL: http://web.archive.org/web/20070208005317/diver.stanford.edu/overview.html>, 1 page.

"Digital Interactive Video Exploration & Reflection (DIVER)—Teacher Education", [online], Stanford University (Feb. 8, 2007) [retrieved Jan. 28, 2008]. Retrieved from the Internet: <URL: http://web.archive.org/web/20070208005357/diver.stanford.edu/teacherEd.html>, 1 page.

"Digital Interactive Video Exploration & Reflection (DIVER)—What Makes Diver Different?", [online], Stanford University (Feb. 8, 2007) [retrieved Jan. 28, 2008]. Retrieved from the Internet: <URL: http://web.archive.org/web/20070208005336/diver.stanford.edu/different.html>, 1 page.

Exeros DataMapperTM Data Sheet, [online] (Mar. 29, 2006) [retrieved Jan. 28, 2008]. Retrieved from the Internet: <URL: http://web.archive.org/web/20060329012647/http://www.exeros.com/pdf/DataMapperDataSheet.pdf>, pp. 1-2.

"Five Across Connect 1.8 Community Builder Site Management", [online] (Jul. 2, 2007) [retrieved Jan. 28, 2008]. Retrieved from the Internet: <URL: http://web.archive.org/web/20070702052520/www.fiveacross.com/product/connect_provider.html>, 2 pages.

"Five Across Connect 1.8 Community Builder", [online] (Jul. 1, 2007), [retrieved Jan. 28, 2008]. Retrieved from the Internet: <URL: http://web.archive.org/web/20070701114331/http://www.fiveacross.com/product/index.html>, 1 page.

Five Across Connect 1.8 Data sheet, [online] (Jul. 10, 2007) [retrieved Jan. 28, 2008]. Retrieved from the Internet: <URL: http://web.archive.org/web/20070710104211/http://www.fiveacross.com/product/Connect_1_8_datasheet+FINAL.pdf>, 1 page.

"Five Across Connect 1.8 Community Builder Implementation" [online] (Jul. 1, 2007) [retrieved Jan. 28, 2008]. Retrieved from the Internet: <URL: http://web.archive.org/web/20070701223046/www.fiveacross.com/product/implementation.html>, 1 page.

"Five Across Connect 1.8 Community Builder End User Features", [online] (Jul. 2, 2007) [retrieved Jan. 28, 2008]. Retrieved from the Internet: <URL: http://web.archive.org/web/20070702052827/www.fiveacross.com/product/connect_end_user.html>, pp. 1-2.

"Pandora Radio—Listen to Free Internet Radio, Find New Music", [online], [retrieved on Oct. 11, 2007]. Retrieved from the Internet: <URL: http://pandora.com>, 1 page.

"Pandora—About the Music Genome Project", [online], [retrieved on Oct. 11, 2007]. Retrieved from the Internet: <URL: http://pandora.com/corporate.mgp>, 1 page.

Techcrunch.com, "Taboola Lands $1.5 Million, Powers Video Discovery" [online] (Nov. 17, 2007). [retrieved Jan. 28, 2008]. Retrieved from the Internet: <URL: http://www.techcrunch.com/2007/11/14/taboola-lands-15-million-powers-video-discovery/>, pp. 1-4.

Kuhlke, U.S. Appl. No. 11/812,452, filed Jun. 19, 2007.

Pelton, U.S. Appl. No. 11/860,115, filed Sep. 24, 2007.

\* cited by examiner

User Selection Preferences, 34

| Likes (Selections Having Positive Affinity) | Ignored | Dislikes (Negative Affinity) (Based on Ratings or Comments) |
|---|---|---|
| Photography/<br>Cameras: Canon EOS<br>Lenses: Canon, Tamron | Nikon<br>Sigma | Olympus, Pentax<br>Tokina |
| History/<br>TV, Video: History Channel/ ← 108<br>The Roman Empire<br>DVD: Bill Clinton: Hope, Charisma,<br>Controversy<br>Film: Syriana,<br>Books: Clinton, "My Life"<br>(Autobiography) | Bible Battles<br>World War 2 Stories<br>Primary Colors | Books: Author=Ann Coulter |
| Drama/<br>TV: "Lost", "West Wing" | CSI: Crime Scene<br>Investigation | "24" |

100 ↗ 66a  104 ↗  68 ↗  66b ↗  102 ↗

Figure 5

SOCIALLY COLLABORATIVE FILTERING

This application is a continuation of U.S. patent application Ser. No. 11/947,298, filed Nov. 29, 2007.

TECHNICAL FIELD

The present disclosure generally relates to devices that perform filter-based searching of data available via information networks such as a wide area network (e.g., the World Wide Web or the Internet), for example collaborative filtering.

BACKGROUND

The exponential growth of information available to users of various information networks (e.g., broadcast, satellite, or cable television; wide area networks such as the World Wide Web or the Internet), requires organizing the presentation of the available information in an efficient and effective manner. Collaborative filtering attempts to organize presentation of information to a user in a wide area network (e.g., the World Wide Web) based on automatically predicting the interests of a user by establishing relationships between items of interest to the user (e.g., items recently viewed by the user at a commercial website) and other items that have been determined as of interest to other users. Item-based collaborative filtering, illustrated for example at the website "amazon.com" (users who bought x also bought y) is based on the premise that if a number of users purchase both items "x" and "y", then another user viewing (or purchasing) the item "x" also may be interested in the item "y".

Other examples of filtering content include human directed programming (e.g., conventional network television programming), demographic based targeting that classifies individuals according to demographics, content based targeting (e.g., Google AdSense available on the World Wide Web at the website address "google.com/adsense"), user defined filters (e.g., a TiVo® WishList search on a commercially-available TiVo® Digital Video Recorder), popularity based targeting, domain-specific knowledge recommendation systems (e.g., available at the website address "pandora.com") and ratings-based filtering (e.g., a ratings system provided by the online service "Netflix" at the website "netflix.com").

BRIEF DESCRIPTION OF THE DRAWINGS

Reference is made to the attached drawings, wherein elements having the same reference numeral designations represent like elements throughout and wherein:

FIG. 5 illustrates example user selection preferences for an identified user accumulated based on the input options presented to the user, the user selection inputs executed by the identified user, and input options not having been selected by the identified user, according to an example embodiment.

DESCRIPTION OF EXAMPLE EMBODIMENTS

Overview

Figure 1:
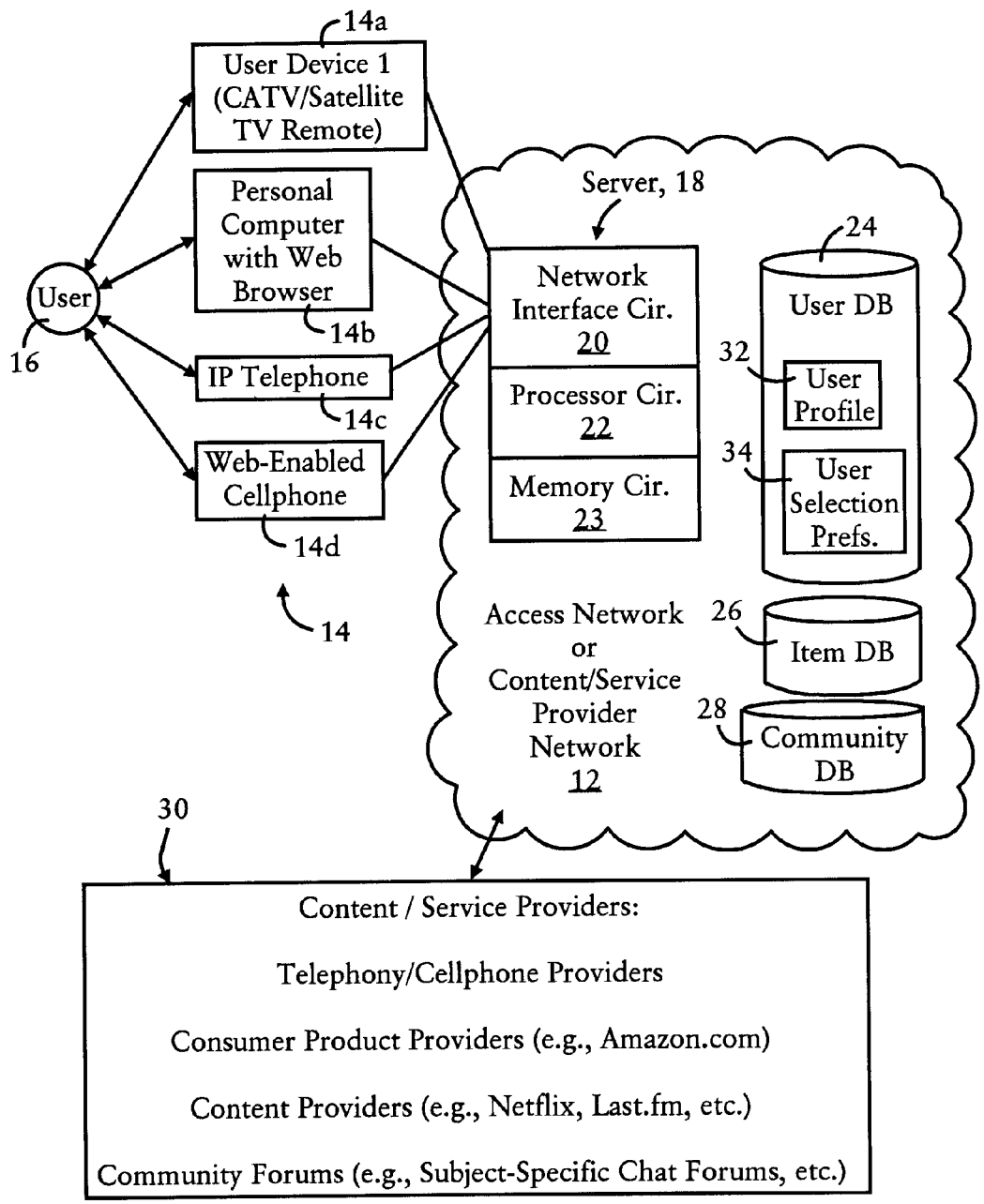
FIG. 1 illustrates an example system for executing socially collaborative filtering for generation of recommendations personalized to a user's tastes, according to an example embodiment.

In one embodiment, a method comprises identifying, by an apparatus in a network, user selection preferences of an identified user having accessed the network, the identifying based on an accumulation of user selection inputs executed by the identified user, the user selection inputs accumulated relative to input options presented to the user and identifying respective available network items, the accumulation including an identification of the input options not having been selected by the identified user; determining by the apparatus a group of network users having a highest correlation of shared interests with the identified user in response to detecting the identified user is accessing the network, based on (1) identifying, from the available network items, preferred network items having highest relative item affinity values generated for the identified user based on the user selection preferences, and (2) identifying first network users providing highest relative user affinity values for each of the preferred network items based on the respective user selection preferences; and determining, by the apparatus, at least one of new network items most likely to be preferred by the identified user, based on determining, from among network items not presented to the identified user, the preferred network items for each of the first network users in the group based on the respective user selection preferences.

In another embodiment, an apparatus comprises a network interface circuit and a processor circuit. The network interface circuit configured for determining an identified user is accessing a network, and in response outputting, via the network for presentation to the identified user, a recommendation of at least one of new network items most likely to be preferred by the identified user. The processor circuit is configured for generating the recommendation of at least one of new network items in response to the identified user accessing the network. The processor circuit further is configured for generating the recommendation of at least one of new network items based on: identifying user selection preferences of the identified user based on an accumulation of user selection inputs executed by the identified user, the user selection inputs accumulated relative to input options presented to the user and identifying respective available network items, the accumulation including an identification of the input options not having been selected by the identified user; determining a group of network users having a highest correlation of shared interests with the identified user in response to detecting the identified user is accessing the network, based on (1) identifying, from the available network items, preferred network items having highest relative item affinity values generated for the identified user based on the user selection preferences, and (2) identifying first network users providing highest relative user affinity values for each of the preferred network items based on the respective user selection preferences; determining the new network items most likely to be preferred by the identified user based on determining, from among network items not presented to the identified user, the preferred network items for each of the first network users in the group based on the respective user selection preferences.

DETAILED DESCRIPTION

Particular embodiments enable a system (e.g., a service provider, a media content provider, an electronic commerce website) to provide personalized recommendations to a user of the system based on tracking user activities in order to identify user selection preferences. Any and all network-based activities by a user can be identified relative to the context presented to the user, namely the input options presented to the user. The user selection preferences can be identified based on accumulating the identified network-based activities relative to the context presented to the user, including not only accumulating the user selection inputs executed by the identified user, but also identifying and accumulating the input options that were presented (i.e., offered) to the user but ignored by the user. Consequently, the user selection inputs can be more precisely evaluated when compared in context with the other input options that were presented to the user (e.g., at the same time as the input option selected by the user), but that were ignored by the identified user based on detecting the respective input options were not selected by the user.

The accumulation of user selection inputs by the user, relative to the context of the input options presented to the user but ignored by the user, demonstrate "socially relevant gestures" that can be used by the system to identify the user selection preferences. Socially relevant gestures can include: identifying the user for example based on user login or detecting a unique identification token (e.g., an RFID tag, a digital signature, a cookie, etc.); identifying a physical or network location of the user (e.g., based on presence information or locality information provided either explicitly or inherently by a user device utilized by the user to access the network); identifying content that the user has chosen historically with respect to viewed content (e.g., tracking what television shows, movies, etc. a user has viewed and for how long, or identifying a location within presented content where a user changes his or her interest to other content or browsed content); identifying content or items that the user has commented on, for example within online forms or communities; identifying network access activities by the user, for example types of user devices used to access network items, duration of access, whether multiple access devices are concurrently utilized, etc.

The identification of the user selection preferences for a given user (based on having detected the socially relevant gestures of the user) can be used with network information maintained within the system in order to dynamically generate recommendations for the user that are based on a collaborative filtering of the user selection preferences with the network information. Hence, applying collaborative filtering to the user selection preferences in combination with the network information results in a socially collaborative filtering of content that is personalized precisely for the user.

Hence, socially collaborative filtering executed by the example embodiments can enable different users to enjoy uniquely personal experiences, even when the different users access the very same content (e.g., an e-commerce website or a video or DVD website such as "Netflix") for the first time.

The socially collaborative filtering executed by the example embodiments provides personalized and context-sensitive recommendations that can be updated in response to each detected socially relevant gesture by a user. The example embodiments can update the user selection preferences for a given user in response to each successive user selection input, including the corresponding context, and in response successively generate corresponding updated recommendations for the user. For example, in response to the system detecting that a user turns on his or her television set every weekday morning, the socially collaborative filtering executed by the example embodiments can determine from the user's socially relevant gestures that the user would most likely prefer a specific news channel, and in response present the user with his or her favorite TV news channel (e.g., CNN as opposed to Fox News or local news). Detecting a request for a channel change can cause the example embodiments to provide the next favorite content based on the user selection preferences relying on the socially relevant gestures, for example sports news that is custom tailored for a specific sports category or team, and which does not provide any news related to certain sports teams disliked by the user Hence, the updating of the user selection preferences in response to each socially relevant gesture by a user can be used to increase an affinity for the network item being presented (i.e., offered) to the user, in other words strengthening the relationship between the user and the network item being presented to the user. The updating of the user selection preferences also can be used to decrease an affinity for network items being presented to the user in order to decrease the strength of the corresponding relationship, for example in the case of network items that are ignored by the user, or detection of socially relevant gestures demonstrating that the user exhibits a dislike for certain network items.

As described in further detail below, use of the term "network item" in this specification refers to online content that can be consumed by a user directly via the network (e.g., online videos, music, e-books, online articles, written commentary, etc.), and network objects that explicitly represent tangible goods (or a collection thereof) that can be obtained by the user using the network for consumption thereof (e.g., ordering DVD videos via "Netflix.com" or "Amazon.com", tangible goods such as books, videos, etc., via "Amazon.com", etc.). Hence, the term "network item" does not include ratings (e.g., a star-based rating), etc. that may be associated with online content or network objects representing tangible goods; rather, such ratings are used to identify socially relevant gestures relative to identified network items.

FIG. 1 illustrates an example system for executing socially collaborative filtering for generation of recommendations personalized to a user's tastes, according to an example embodiment. The system 10 includes a network 12 configured for detecting user selection inputs from user devices 14 under the control of an identifiable user 16. Example user devices 14 can include a remote control 14a for an intelligent digital television system, a personal computer 14b having a web browser, an IP based telephone 14c (e.g., a voice over IP telephone), and/or a web enabled cell phone 14d that can be configured for wireless voice over IP communications. The IP telephone 14c and the web-enabled cell phone 14d also can include a web browser.

Each of the user devices 14 can be configured for sending the user selection inputs to the network 12, either directly or via intermediate devices (e.g., cable or satellite television set-top box configured for sending requests to the network 12; local access router at the customer premises, etc.) to a server 18 configured for responding to the user selection inputs by supplying recommended content back to the requesting user device 14.

As described in further detail below, the server 18 includes a network interface circuit 20 and a processor circuit 22. The network interface circuit 20 can be configured for receiving or detecting the user selection inputs from the user devices 14; the network interface circuit 20 also can be configured for accessing databases 24, 26, and/or 28, described below; network interface circuit 20 also can be configured for outputting personalized recommendations to the user devices 14, where the personalized recommendations can include at least one new network item determined most likely to be preferred by the identified user 16 based on socially collaborative filtering executed by the processor circuit 22. The new network item supplied to the user device can be implemented either as a reference (e.g., a Uniform Resource Identifier (URI)) to the recommended content available from identifiable providers 30, or in the form of the actual content to be presented for consumption by the user 16 (i.e., consumed by the user) based on the server 18 retrieving the recommended content from the content or service providers 30.

The example server 18 can be implemented as a single server that can be implemented at the head end of an access network 12 for a content provider offering content services to the user 16, the access network 12 providing access to other content or service providers 30 via a wide area network such as the Internet; alternately, the example server 18 can be implemented as a distributed server system within the network 12, where a first server within the distributed server system receives the user inputs and updates the user selection preferences, described below, and a second server within the distributed server system determines and outputs personalized recommendations for the user 16 based on the updated user selection preferences; alternately, the first server can interact with the user by detecting user inputs and supplying recommendations of new network items to the user, and a second (back-end) server can generate the recommendations of the new network items to be presented to the user, where either the first server or the second server can determine the socially relevant gestures from the user inputs. The example server 18 also can be implemented as part of a content provider network 30 that provides various services to the user 16 via a wide area network such as the Internet.

The example server 18 will be described herein within the context of a single, integrated server to simplify the description of the example embodiments. The operations described with respect to the server 18 also can be implemented in various forms, including a distributed server system implemented within an access network locally reachable by the user devices 14, or a distributed server system implemented within a content provider network that is remotely reachable by the user devices via a wide area network.

The server 18 can generate personalized recommendations for the user 16 based on executing socially collaborative filtering based on retrieval of information that can be stored in a user database 24, an item database 26, and/or a community database 28. The user database 24 can be configured for storing information related to the user 16, including a user profile 32 and user selection preferences 34. The user profile 32 can include information about the user 16, including personal account subscription information related to establishment and maintenance of any network service utilized by the network devices 14; the user profile 32 also can include identification of other network users that have a close relationship with the identified user 16 (i.e., user-to-user relationships), for example "buddy lists" for instant messaging sessions or cell phone subscriptions, or users of online forums that the user 16 has identified as being "favorite" users or "disliked" users. The user selection preferences 34, described in further detail below with respect to FIG. 5, can illustrate the socially relevant gestures of the identified user 16 based on an accumulation of the user selection inputs executed by the identified user 16 relative to the context of those user selection inputs (i.e., relative to other input options that were concurrently presented to the user with the input option that was selected by the user). As described below, the socially relevant gestures for the identified user 16 can be used to establish various relationships, for example user-item relationships that identify the network items for which the identified user 16 demonstrates having the highest affinity (i.e., preference).

The item database 26 can be configured for storing information about network items that are available for presentation to the user, including item-to-item relationships and item-to-user relationships, described below. The community database 28 can include information identifying relationships between the identified user 16 and other elements of a community-based network service, for example messaging boards, Internet-based recommendation sites, Internet-based social community websites, etc., where the identified user 16 can identify himself or herself as having particular preferences in terms of political interests, hobbies, "favorite" users, "disliked" users, preferred content, or content to avoid. The community database 28 is not strictly necessary for implementation of the example embodiments, but can add to generation of additional socially relevant gestures.

Figure 2:
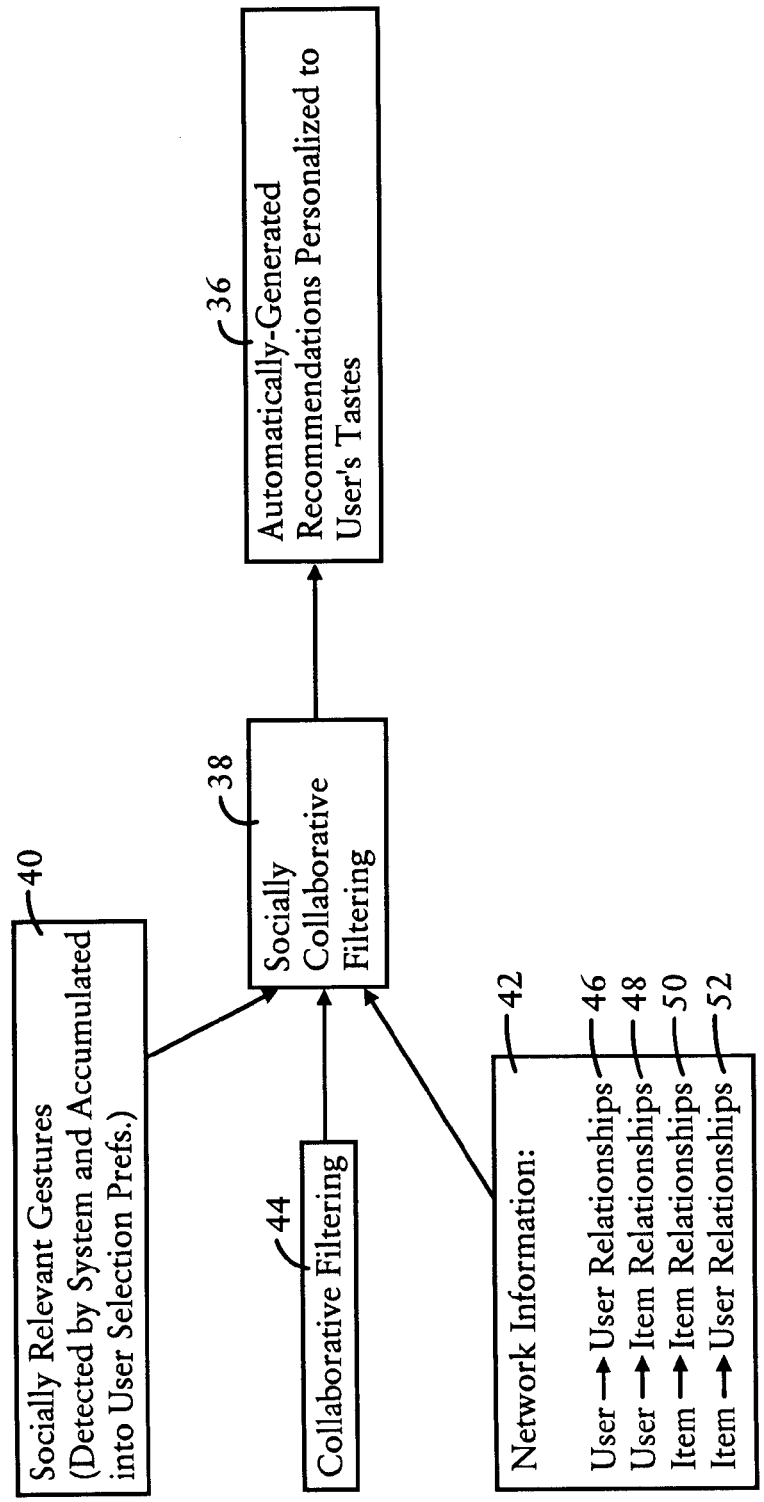
FIG. 2 illustrates an example execution of socially collaborative filtering for generation of the recommendations personalized to a user's tastes, according to an example embodiment.

FIG. 2 illustrates a summary example execution of socially collaborative filtering by the processor circuit of FIG. 1, according to an example embodiment. As described below, the processor circuit 22 can access any one of the databases 24, 26, and/or 28 in order to determine a list 36 of recommendations of new network items that would most be preferred by the identified user 16 based on execution of socially collaborative filtering 38 by the processor circuit 22. In particular, the processor circuit 22 can execute socially collaborative filtering 38 based on applying the socially relevant gestures 40 exhibited by the user selection preferences 34 to available network information 42 using collaborative filtering techniques 44.

The network information 42 can include one-way relationships that demonstrate affinities of a given network object toward another network object. For example, the network information 42 can include one-way user-user relationships 46, one-way user-item relationships 48, one-way item-item relationships 50, and one-way item-user relationships 52. As described below, the processor circuit 22 can determine each of the relationships 46, 48, 50 and 52 based on socially relevant gestures 40, and store the relationships 46, 48, 50 and 52 in an appropriate database 24, 26, or 28 for future use, for example updating the relationships 46, 48, 50, or 52 in response to additional detected socially relevant gestures.

The user-to-user relationships 46, which can be determined and stored by the processor circuit 22 in the user profile 32 and/or the community database 28, can demonstrate specific affinity determined by the processor circuit 22 between one person toward another person, where a given person (A) can have a strong affinity toward another person (B) based on a close personal or business relationship, whereas the second person (B) may demonstrate a lesser affinity toward the first person (A) for example in the case of a manager or popular individual (B) being admired by the other person (A). Hence, the users A and B can demonstrate asymmetric (i.e., unequal) affinity values toward each other. The user-to-user relationships 46 typically are updated only when the relevant user (e.g., A) establishes or updates (e.g., modifies or deletes) the relationship with the other user (B); hence, the user-to-user relationships 46 are not updated as a result of the user (A)'s interactions with network items.

Figure 6:
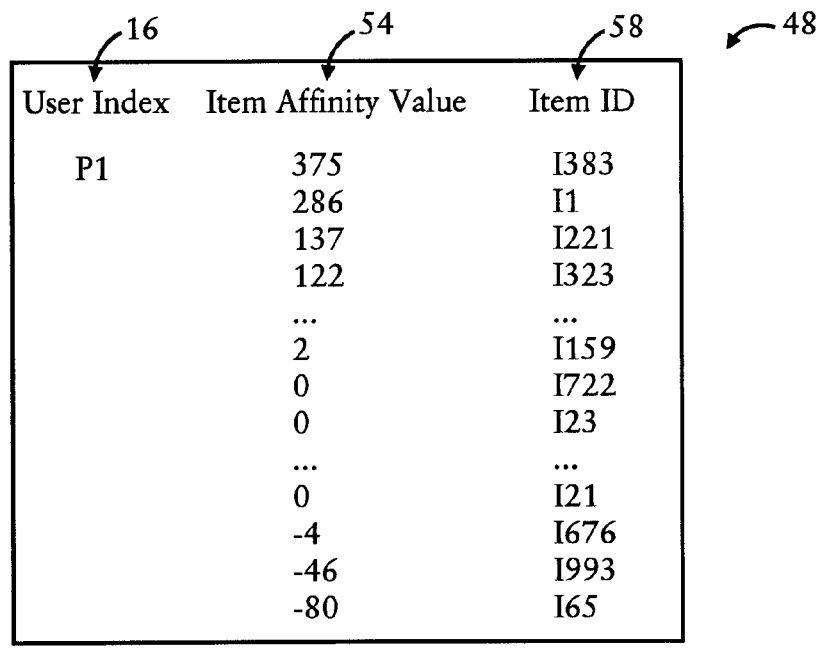
FIG. 6 illustrates example item affinity values for a given user based on the corresponding user selection preferences, according to an example embodiment.

The user-item relationships 48, stored for example by the processor circuit 22 in the user selection preferences 34 and illustrated below with respect to FIGS. 6 and 8, can demonstrate specific affinity values generated by the processor circuit 22 and that represent the available network items 58 presented to the user 16 for which the corresponding user 16 has expressed the greatest interest or affinity: the specific affinity values that demonstrate the relative affinity or "strength" of the user-item relationships 48 are illustrated in FIG. 6 as "item affinity values" 54.

The item-item relationships 50, which can be generated and stored by the processor circuit 22 in the item database 26, can demonstrate predetermined relationships between distinct network items, for example: relationships established between products and different accessories (e.g., battery charger for a cellphone or other battery-operated device); relationships between similar video content based on the same actors, actresses, directors, etc.; music written and performed by the same performer, etc. The item-item relationships 50 also can demonstrate relationships determined by the processor circuit 22 based on analysis of network content and performing comparisons between network items. An example item-item relationship 50 can be expressed by an e-commerce website that presents a product "X" with a related product "Y" with the description that individuals who purchased "X" also purchased "Y". Example techniques for implementing item-item relationships 50 include domain specific knowledge: examples of implementing domain specific knowledge include the commercially available filtering offered by ChoiceStream (at the website address "choicestream.com"), which determines equivalents between movies, or ExpertSystems technology for determining similarity between concepts in text based content. Use of the item-item relationships 50 by the processor circuit 22 enables more efficient and faster determination of equivalence for new content (i.e., new network items) that are added to (i.e., made available to) the system 10. Such relationship analysis can be performed at any time, including when the network items are added to the system 10, when any user accesses the network items, or during background scans of content within the system 10.

Figure 7:
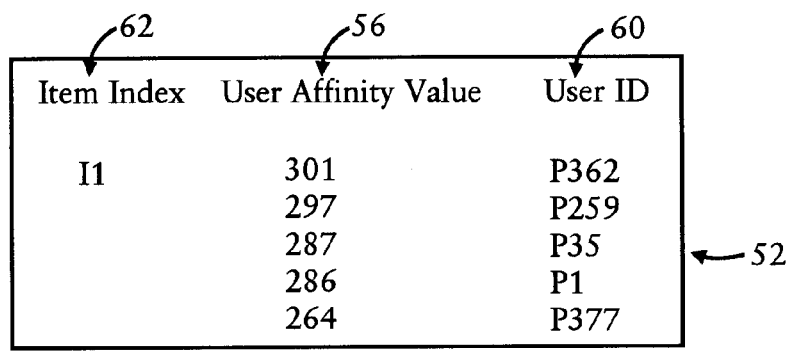
FIG. 7 illustrates example user affinity values provided by network users for a given network item, according to an example embodiment.
Figure 9:
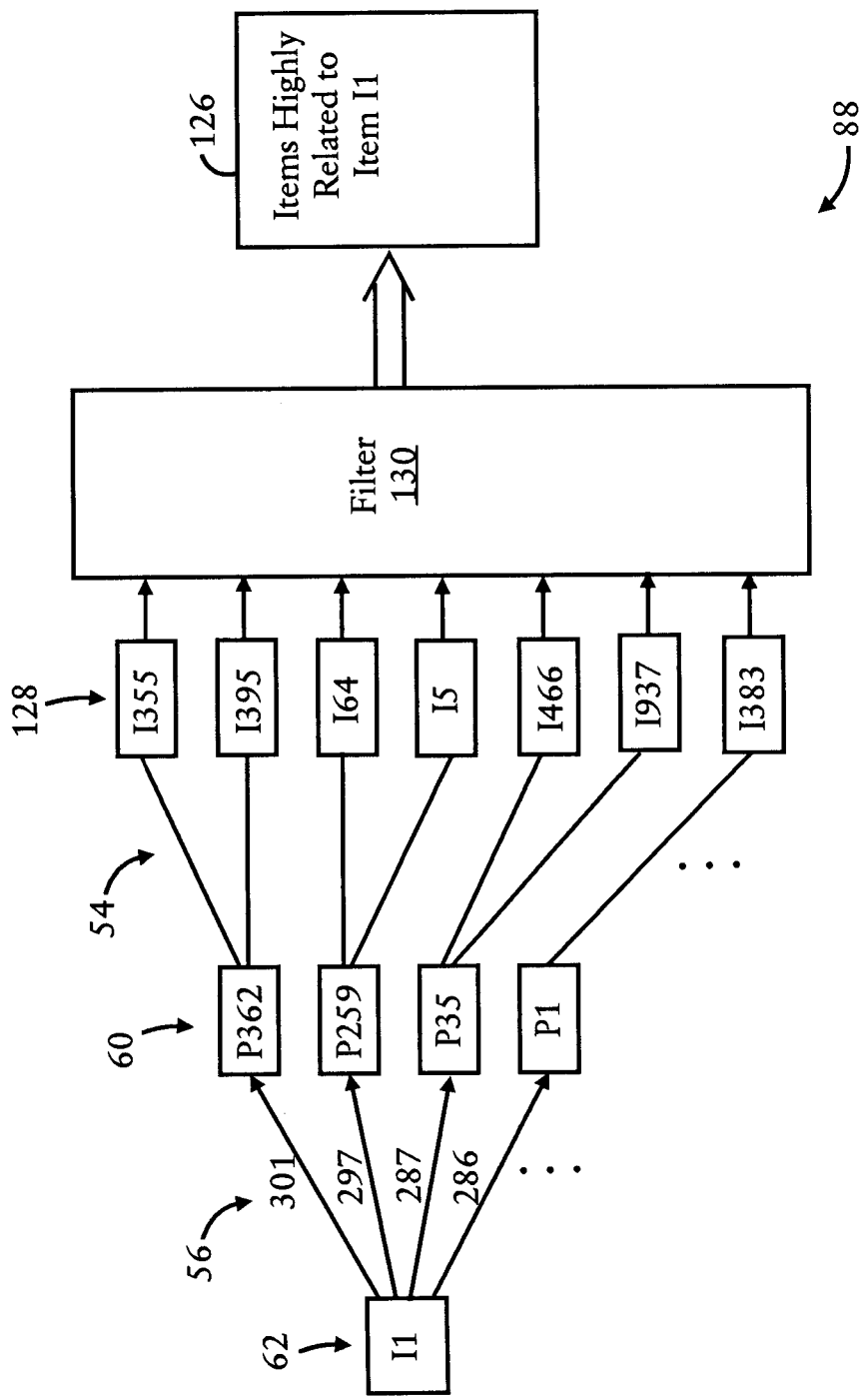
FIG. 9 illustrates an example determination of items highly related to a selected network item, according to an example embodiment.

The item-user relationships 52, which can be determined and stored by the processor circuit 22 in the item database 26, can demonstrate, for a given item, the relative affinity or "strength" of network users determined by the processor circuit 22 to a given item: the specific affinity values that demonstrate the "strength" of the item-user relationships 52 are illustrated in FIGS. 7 and 9 as "user affinity values" 56, where the network users having the strongest affinity toward a given item 62 (based on their corresponding item affinity value 54) are identified within the item-user relationships 52. Hence, each item-user relationship 52 has a corresponding "mirroring" (i.e., converse) user-item relationship 48. Use of distinct databases for the relationships 48 and 52 provide more efficient mapping, although it is foreseeable that a single database could be used to construct the relationships 48 and 52, regardless of the direction of the mapping.

Any of the disclosed circuits of the server 18 (including the network interface circuit 20, the processor circuit 22, and the memory circuit 23 and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 23) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 23 can be implemented, for example, using a nonvolatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22. In addition, the processor circuit 22 can be implemented as a multi-processor system or based on a distributed server system.

Figure 3:
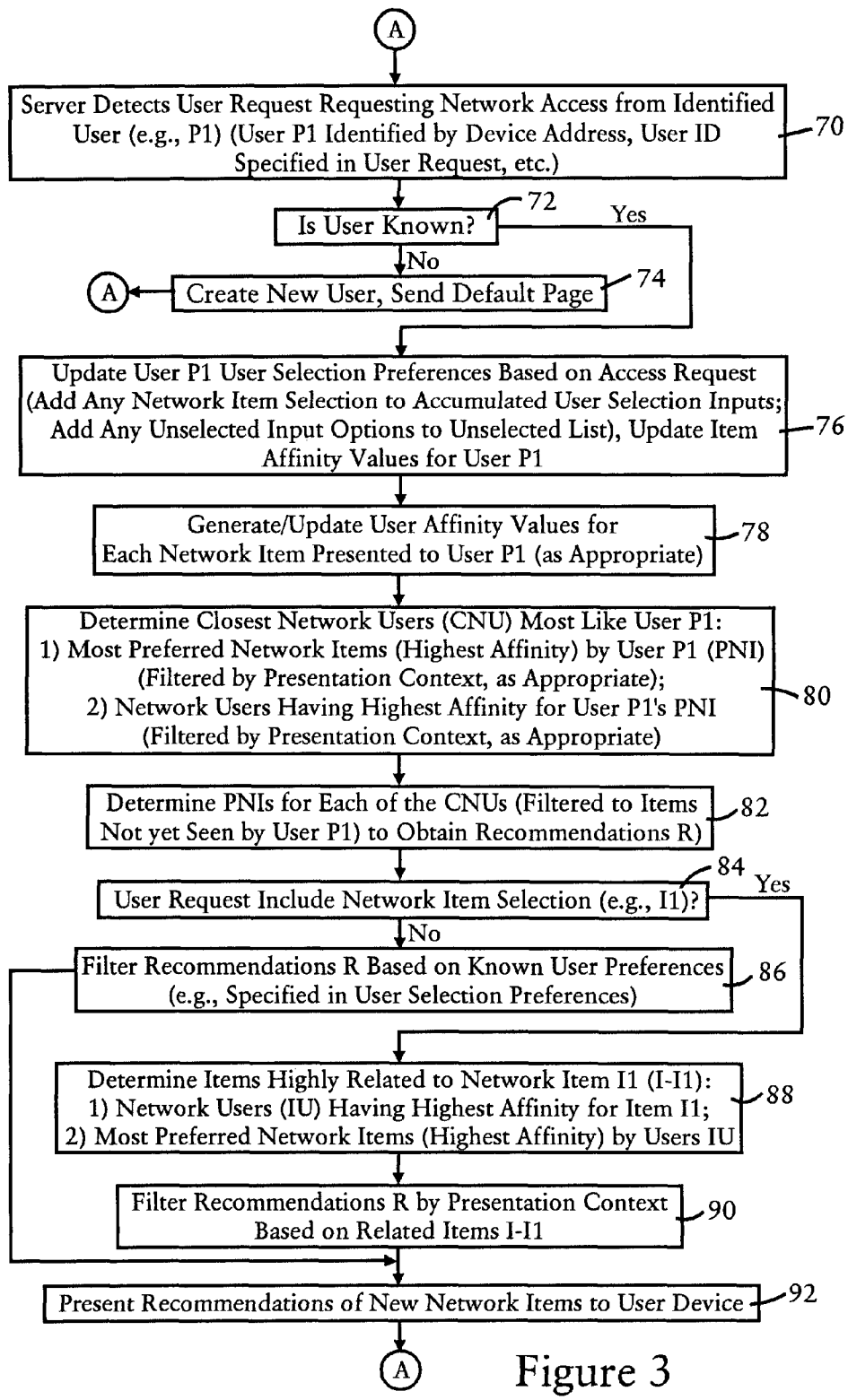
FIG. 3 illustrates an example method by the apparatus of FIG. 1 of generating the recommendations personalized to a user's tastes, according to an example embodiment.

FIG. 3 illustrates an example method by the server 18 of FIG. 1 of generating the recommendations 36 personalized to a user's tastes based on execution of socially collaborative filtering 38, according to an example embodiment. The steps described in FIG. 3 can be implemented as executable code or encoded logic stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The network interface circuit 20 of the server 18 can detect in step 70 that the user ("P1") 16 is accessing the network 12, for example detecting a request from one of the user devices 14 addressed specifically to the network interface 20; alternatively, in a distributed server system the network interface circuit 20 can receive a request from another server (not shown) within the network 12 having received the user request. The user (e.g., "P1") 16 can be identified by the server 18 or the other server (not shown) using different techniques, for example based on identifying a device address of the corresponding user device 14, a user identifier specified within the user request, an indicator identifying the physical or network presence of the user 16, etc. If in step 72 the user is not known, the processor circuit creates in step 74 a new user identifier entry, and sends to the new user a default introduction page to the access device 14 that includes a list of input options identifying respective available network items (e.g., products and services such as movies, e-commerce shopping, Internet messaging forums, search operations, etc.).

Assuming in step 72 that the user is known as an identified user 16, the processor circuit 22 in the server 18 (or another server in a distributed server system) can update in step 76 the user selection preferences 34 in response to each input by the user 16 based on identifying the user selection input relative to the input options presented to the user identifying the respective available network items (i.e., the context of the corresponding user selection input), and any unselected input options indicating that the user 16 ignored these unselected input options. The identification of the user selection input relative to the context of input options presented to the user will be described in further detail with respect to FIGS. 4A and 4B.

Figure 4A:
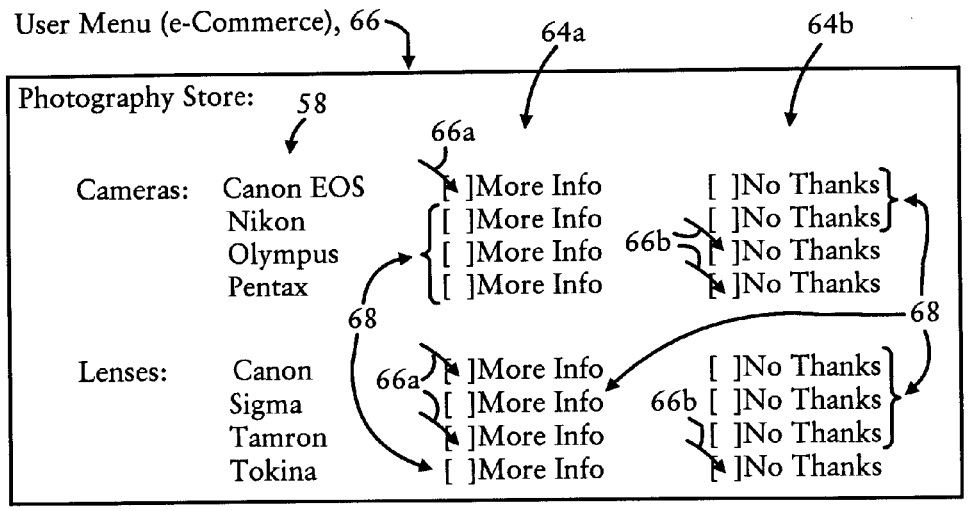
FIGS. 4A and 4B illustrate example input options presented to the user by the apparatus of FIG. 1, user selection inputs executed by the user, and user input options that are not selected by the user.

FIG. 4A illustrates example input options 64 presented to the user 16 and identifying respective available network items (e.g., identified content or tangible products). The input options 64 can be presented to the user 16, for example, in the form of one or multiple web pages that provide a user menu 66 of available products that can be purchased by the user 16. The user menu 66 illustrated in FIG. 4A illustrates multiple selections 66a and 66b that can be input over time by the user 16; hence, the user menu 66 illustrates an accumulation of multiple selections 66a and 66b that have been made by the user 16 for different network items 58. The processor circuit 22 can update in step 76 the user selection preferences 34, illustrated in FIG. 5, in response to each input 66a or 66b by the user 16, including positive user selection inputs 66a indicating the user 16 has a stronger affinity toward the corresponding selected input option 64, and/or negative user selection inputs 66b indicating the user 16 has a weaker affinity toward the corresponding selected input options 64. Hence, the user selection preferences 34 can be updated by the processor circuit 22 in step 76, for each detected user input 66a, to indicate the network items for which the user has expressed a favorable affinity ("Likes") 100; as apparent from the foregoing, multiple requests for the same or similar items can cause respective updating of the user selection preferences that can indicate a stronger affinity toward a given network item 58.

As illustrated in FIG. 4A, the processor circuit 22 also can determine the context of the corresponding user selection input 66a or 66b by also identifying input options 68 within the presentation 66 of available network items 58 that have not been selected by the user 16. Hence, the processor circuit 22 can identify the input options 68 that were not selected by the user 16, but rather were ignored by the user 16 who favored either a positive selection 64a or a negative selection 64b, by adding to the user selection preferences 34 an "ignore" category 104 identifying the input options 68 that were not selected by the identified user 16.

Figure 4B:
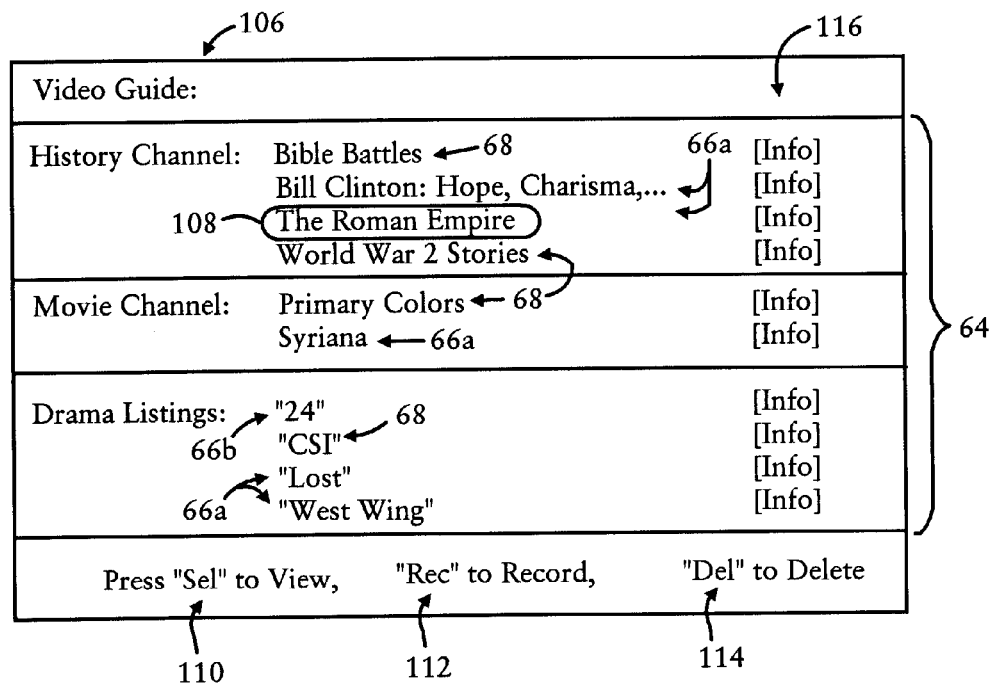

FIG. 4B illustrates additional input options 64 that can be presented to the user, for example in the form of a video guide 106. As illustrated in FIG. 4B, the user 16 can navigate the video guide 106 using the remote control 14a in order to highlight 108 a particular input option 64: in response to the user 16 pressing a selection key 110 to view the highlighted input option 108, the processor circuit 22 can update in step 76 the user selection preferences 34 to indicate that the user 16 has expressed a positive affinity 100 toward the highlighted input option (e.g., the documentary "The Roman Empire") 108, along with an identification of other network items 64 that were ignored by the user 16. As apparent from FIGS. 4A, 4B, and 5, various network items may be moved from the ignored category 104 to either the favorable affinity category 100 or the unfavorable affinity category 102 based on subsequent input selections by the user 16, for example in response to detecting the user 16 pressing the record key 112 (indicating a positive affinity 100 based on the corresponding positive user selection input 66a), or the user 16 pressing the delete key 114 (indicating a negative affinity 102 corresponding to the negative user selection input 66b expressed by the delete key 114). The processor circuit 22 also can update the user selection preferences 34 based on the user 16 requesting additional information 116 about a given input option 64.

Hence, the user selection preferences 34 can be updated in step 76 of FIG. 3 in response to each corresponding user selection input (e.g., 66a, 66b, 110, 112, 114): as described previously, the user selection preferences 34 can be updated by the processor circuit 22 in the same server 18 that receives the request in step 70, or by another server (not shown) in a distributed server environment. The updated user selection preferences 34 can be used by the processor circuit 22 in the server 18 (or another distributed server) to generate in step 76 item affinity values 54 for the user ("P1") 16, illustrated in FIG. 6. In particular, the processor circuit 22 can parse the user selection preferences 34 in order to quantify the relative "strength" of the user 16 toward a given network item (identified by its item identifier 58) in the form of an item affinity value 54, where a higher value indicates a stronger relationship by the user 16 toward the corresponding item 58, a zero value indicates no preference for the corresponding item 58 (e.g., the item has been ignored), and a larger negative member indicates a stronger dislike by the user 16 toward the corresponding item 58.

In response to the updating of the user selection preferences 34 in step 76 of FIG. 3 (either by the same server 18 or another server in a distributed server environment), the processor circuit 22 can generate and/or update in step 78 user affinity values 56 for each relevant network item 62 (illustrated in FIG. 7), for example each network item having a corresponding input option presented to the user. In particular, the processor circuit 22 can identify the user affinity values 56 for each network item 62 based on identifying the order of the highest item affinity values 54 (illustrated in FIG. 6) assigned by any of the network users 60, such that each user affinity value 56 of FIG. 7 identifies the corresponding affinity (e.g., "301") by the corresponding network user (e.g., "P362) 60 toward the corresponding network item (e.g., "I1") 62. Hence, each user affinity value 56 is based on the corresponding user selection preference 34 for the corresponding user (e.g., "P362").

The user affinity values 56 illustrated in FIG. 7 also can be updated in step 78 of FIG. 3 without necessarily relying on the user selection preferences 34, for example in response to a detected user selection input that does not necessarily represent a "request" for an available network item. In particular, a detected user selection input can represent a socially relevant gesture of a user's preference toward an available network item, for example in the form of a subjective rating by the user about an available network item.

The socially relevant gesture of a user supplying a user selection input demonstrating a preference (very favorable or very unfavorable) regarding an available network item is considered more important than the actual value of the preference. In particular, conventional collaborative filtering systems rely on actual ratings values assigned by the users in order to predict users' tastes. Such conventional approaches for identifying users who share the same rating patterns with the active user rely on identifying users having chosen the same rating values for the same network items; in other words, conventional collaborative filtering systems establish user-user relationships based on identifying users sharing the same rating values for the same network items. Consequently, if a user "A" inputs a five-star rating for a given item "X" and a user "B" also inputs a five-star rating for the same item "X", conventional collaborative filtering systems would establish a relationship between the users "A" and "B" based on both users entering the same rating value (five stars) for the same item "X". Such collaborative filtering techniques have been used to determine cohorts (i.e., a group of individuals having similar tastes). An example of fixed cohorts (using fixed demographic data) is illustrated for example by the Claritas Prizm Clustering by Claritas, Inc., San Diego, Calif.

In contrast, the disclosed embodiment does not store rating values, nor does the disclosed embodiment necessarily rely on the ratings values assigned by users. In fact, the inventors have discovered that actual ratings values have little value in determining recommendations (e.g., due to subjective and inconsistent criteria that may be used even by the same user at different times). Rather, the inventors have discovered that a more effective and reliable indication of a user's interest (favorable or negative) in a given network item is the detection of the user having exerting the effort to rate the network item. In other words, the detected existence of a rating for an item is more important than the rating value in determining the user's interest.

Hence, the processor circuit can record the act of the user supplying a recommendation within a user selection input as a socially relevant gesture, based on updating in step 78 of FIG. 3 an item affinity value 54 for a corresponding network item 58 in response to detecting the user selection input. For example, a user selection input specifying "one-star rating" (representing a most negative rating) by a user can cause the processor circuit 22 to apply in step 78 of FIG. 3 a negative affinity weighting between the network user and the rated item (e.g., reduce an existing item affinity value 54 by a prescribed amount of "−20"); in contrast, a user selection input specifying a "five-star rating" (representing the most positive rating) by the user can cause the processor circuit 22 to apply in step 78 of FIG. 3 a positive affinity weighting to the rated network item (e.g., increase the existing item affinity value 54 by a prescribed amount of "+25"); a rating in between the "one-star rating" and the "five star rating" can cause the processor circuit 22 to apply in step 78 of FIG. 3 a nonzero affinity weighting in between the negative affinity value and the positive affinity value (e.g., reduce the existing item affinity value 54 by a prescribed amount of "−2"). Hence, the detection of the most negative rating or the most positive rating by the user can cause the processor circuit 22 to detect the rating as a corresponding positive or negative socially relevant gesture having an identifiable affinity value.

The detection of an intermediate rating by the user in between the most negative rating and the most positive rating, however, is inherently unreliable in determining the user's interest; hence, the processor circuit 22 can detect the intermediate rating as a socially relevant gesture having a negligible affinity value indicating that the socially relevant gesture has minimal effect on determining the user interest. Hence, the processor circuit 22 can evaluate the value of the socially relevant gesture as a result of the rating input by the user, as opposed to the actual rating value input by the user, where a strong dislike or a strong like is more reliable and more meaningful than a moderate input. Once the rating operation is performed, the disclosed embodiment does not store the actual rating value, but rather records the socially relevant gesture of the user performing the rating operation within a certain context based on updating the corresponding item affinity value 54.

The recording of socially relevant gestures based on updating the corresponding item affinity value also enables the processor circuit 22 to accumulate multiple acts by the user of rating the same item at different instances. Hence, if a user supplies user inputs that assign the highest rating for a given network item on three separate instances (e.g., over the course of a few days or weeks), the processor circuit 22 can increase the item affinity value 54 by that user toward the rated network item in response to each detected socially relevant gesture. Hence, each socially relevant gesture of assigning the highest rating to the network item causes a corresponding increase in the corresponding item affinity value 54, representing the user affinity toward the rated content. In contrast, conventional systems that rely on the value of the rating only will store the most recently entered rating value. Hence, the act of rating is considered significant as a socially relevant gesture, as opposed to the value of the rating.

Another example of accumulating multiple user selection inputs by the user, relative to ignored input options, can be a user selecting an input option after repeated instances of ignoring the input option during prior presentations. For example, if a user ignores an input option after five successive presentations, the corresponding item affinity value 54 can be reduced by a corresponding negative weighting based on the user ignoring the input option; however, if on the next successive presentation the user selects the previously-ignored input option, a much higher positive weighting can be added to the item affinity value 54 that outweighs the prior accumulated negative weightings, resulting in a net positive item affinity value 54.

Hence, the processor circuit 22 can identify a socially relevant gesture as increasing at least one item affinity value (a positive socially relevant gesture), decreasing at least one item affinity value (a negative socially relevant gesture), or generating little or no change in any item affinity value (a neutral socially relevant gesture). A positive socially relevant gesture can be detected by the processor 22, for example, in response to a user 16 creating content, submitting positive comments on the content, providing a strong positive rating for the content (i.e., 5-star rating), or recommending the content to another user or to a group of users in an online community. A neutral socially relevant gesture can be detected by the processor 22, for example, in response to a user 16 viewing the content (e.g., for a brief interval indicating mild interest in the content), or providing a neutral rating for the content (e.g., 2-4 star rating). A negative socially relevant gesture can be detected by the processor 22, for example, in response to a user 16 repeatedly ignoring content after multiple presentation offerings, submitting negative comments on the content, providing a strong negative rating (e.g., a 1-star rating from the 5-star rating system), or abandoning viewing of the content.

Figure 8:
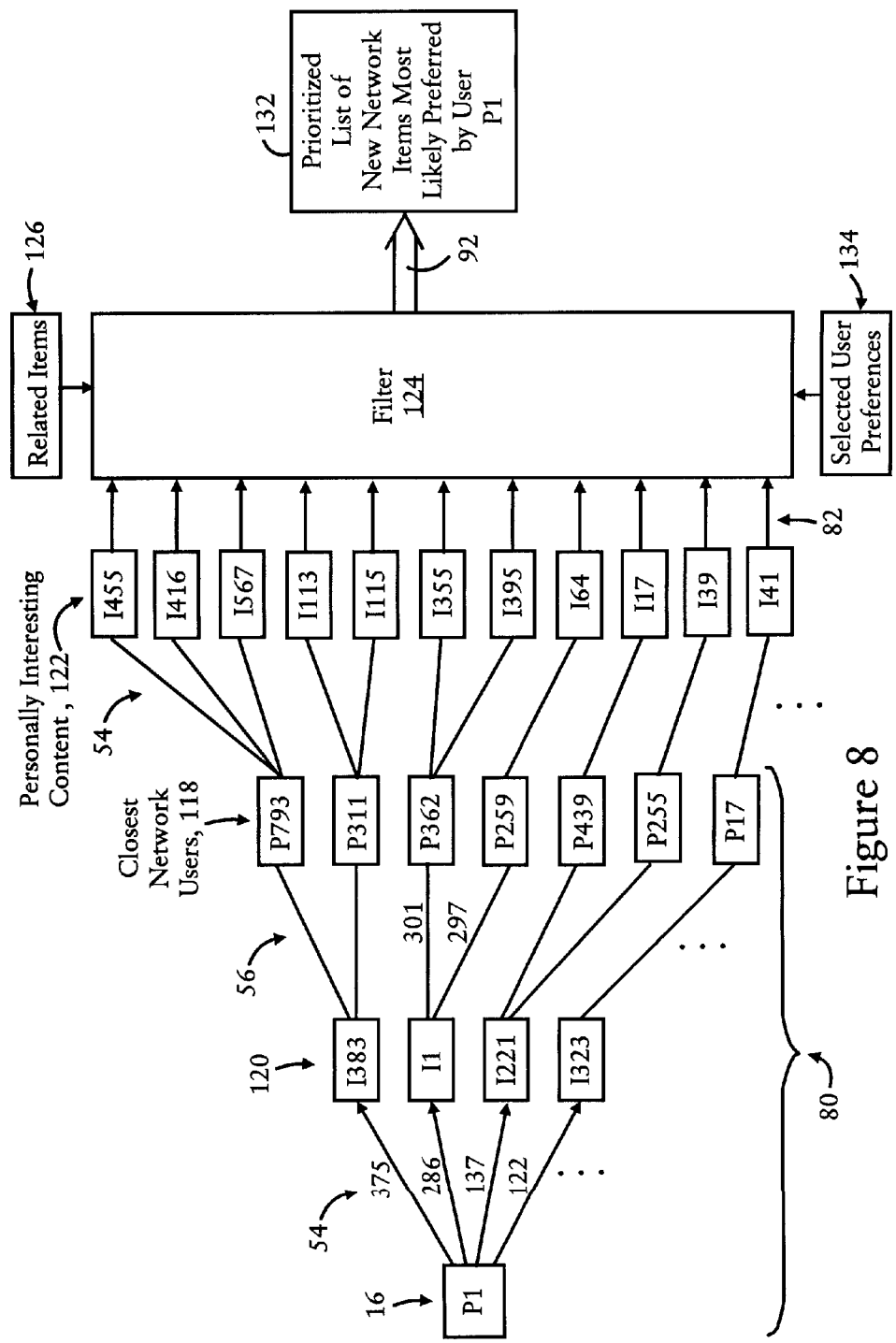
FIG. 8 illustrates an example determination of a prioritized list of network items most likely to be preferred by an identified user based on determining closest network users having the highest correlation of shared interests with the identified user, and identifying network items having the highest relative item affinity values among the similar network users, according to an example embodiment.

Referring back to FIG. 3, after updating of the user selection preferences 34, the user-item relationships 48 and/or the item-user relationships 52 (and storage in the appropriate databases illustrated in FIG. 1), the processor circuit 22 of the server 18 can continue execution of the socially collaborative filtering 38 by determining in step 80 the closest network users (CNU) 118, illustrated in FIG. 8, that have the highest correlation of shared interests with the identified user ("P1") 16, in response to the processor circuit 22 detecting that the user 16 is accessing the network. As described previously, the processor circuit 22 can detect that the identified user ("P1") 16 is accessing the network 12 based on the network interface circuit 20 receiving either the device request from a user device 14, or based on the network interface circuit 20 receiving an indication from another server in a distributed server system that a recommendation is needed in response to the user request.

FIG. 8 illustrates in further detail the operations of step 80 of FIG. 3. The processor circuit 22 can determine the group of closest network users (CNU) 118 (i.e., those network users 60 having the highest correlation of shared interests with the identified user "P1" 16) based on identifying, from the available network items 58 that have been presented to the user 16 based on the respective input options 64, the preferred network items (PNI) 120 having the highest relative item affinity values 54 generated for the identified user 16, as illustrated in FIG. 6 by the user-item relationships 48 indexed by the user "P1" 16. As described previously, the item affinity value 54 for a network item 58 is generated and updated (e.g., by the processor circuit 22) in response to detecting socially relevant gestures associated with the network item (e.g., multiple user selection inputs for viewing the item, purchasing the item, supplying a "5-star" rating), but does not include any rating value submitted by the user. Note that the preferred network items 120 can include all of the available network items 58 presented to the user, ordered based on the respective item affinity values 54, such that the highest affinity value item (e.g. "I383" in FIGS. 6 and 8) would be the first of the ordered list of preferred network items 120, and the lowest affinity value item (e.g., "I65" in FIG. 6) would be at the end of the ordered list of preferred network items 120.

Hence, the preferred network items 120 that have the highest relative item affinity values 54 for the corresponding identified user ("P1") 16 can represent the available network items 58 for which the identified user ("P1") 16 has expressed the highest interest. As illustrated in FIG. 3, the preferred network items 120 can be filtered by the processor circuit 22 according to presentation context, as appropriate, for example based on limiting the preferred network items 120 to items that are relevant to the menus 66 or 106 having been presented to the user (e.g., filtering out items that are not relevant to photography based on the user having been within the context of a photography store).

The processor circuit 22 also can identify in step 80 the closest network users (CNU) 118 based on identifying the network users providing the highest relative user affinity values 56 for each of the preferred network items (PNI) 120 based on their respective user selection preferences 34. For example, the item "I1" 62 illustrated in FIG. 8 includes within its item-user relationships entry 52 in FIG. 7 the network users "P362", "P259", etc. having the highest respective user affinity values "301" and "297" 56. As illustrated in FIG. 8, the network users "P362" and "P259" are added by the processor circuit 22 to the list of closest network users (CNU) 118 based on their having the strongest relationship with the preferred network item 11"; the processor circuit 22 can repeat the identification of network users providing the highest relative user affinity values, for each of the preferred network items (PNI) 120 based on retrieving the corresponding entry 52, resulting in the collection of the closest network users 118 that have the highest correlation of shared interests with the identified user ("P1") 16.

As illustrated in FIG. 3, the list of the closest network users 118 also can be filtered based on presentation context as appropriate; hence, if the presentation context is photography and the user 16 demonstrates numerous interests or hobbies (e.g., sailing, politics, history, etc.) based on the user selection preferences 34 and other relationships 46, 48, the processor circuit 22 can filter in step 80 the network users 118 that are not relevant to the presentation context, such that only the photography-related network users 118 are accepted (as opposed to other network users that may share interests with the user 16 in sailing, politics, or history but that are unrelated to the presentation context of photography). Other user-user relationships 46 also can be applied as a filter.

Following determination of the closest network users 118 in step 80, the processor circuit 22 can determine in step 82 the preferred network items for each of the closest network users 118, based on the respective item affinity values 54 exhibited by the respective users 118 according to their respective user selection preferences (e.g., the respective user-item relationships 48). The resulting set of the preferred network items for each of the closest network users 118 can be filtered to include only items not yet seen by the user "P1" 16, resulting in a set of new network items ("R") 122 that are most likely to be preferred by the identified user "P1" 16. The identification of items "most likely to be preferred by the identified user" refers to those items determined as having the greatest probability of satisfying the user's interest (or preference) in new items. Hence, the new network items 122 also can be referred to as the most "personally interesting content" to the user 16.

If in step 84 the initial user request does not include any network item selection (e.g., initial device turn-on), the processor circuit 22 can execute a filtering function 124 in step 86 on the recommendations of new network items 122: example parameters for the filtering function 124 can include known user preferences, for example the preferences specified in the user profile 32, age or content restrictions, scheduled preferences (e.g., preferred morning news shows), browsing history, business rules, etc. The processor circuit 22, after filtering the new network items 122 with the filtering function 124, can output in step 92 to the user device a recommendation 132 of at least one new network item (e.g., "1455") 122 most likely to be preferred by the identified user 16. As illustrated in FIG. 8, the recommendation 132 also can be a prioritized list of new network items that are most likely preferred by the user 16. Hence, a user 16 can receive in step 92 the recommendation 132 for at least one new network item determined by the processor circuit 22 as most likely to be preferred by the identified user 16, based on socially collaborative filtering that identifies network items 122 that are most preferred by those network users 118 most closely related to the identified user 16. These network items 122 can be filtered based on known user preferences in order to provide the new network item that is most likely to be preferred by the identified user, enabling the user to enjoy content without initially selecting any content, e.g., a beginning webpage or a beginning television program upon activation of the corresponding user device 14.

If in step 84 the processor circuit 22 determines that the initial user request in step 70 included a user selection input (e.g., 66a or 108) requesting selection of a particular network item (e.g., "I1"), the processor circuit 22 can implement the filter 124 of FIG. 8 in step 88 based on the presentation context provided by the server 18 to the identified user 16.

FIG. 9 illustrates an example implementation by the processor circuit 22 of the filter 124 in step 88 of FIG. 3 by determining a group of network items 126 having the highest relation to the selected network item ("I1") 62. In particular, the processor circuit 22 can determine a group of network items 128 that have the highest relation to the selected available network item 62, based on identifying the group of network users 60 having the highest relative user affinity values 56 for the selected available network item 62, illustrated in FIG. 7; the processor circuit 22 can identify, for each user 60 having the relatively highest relation 56 to the selected item 62, the network items 128 that have the highest relative item affinity values 54 for each of the group of users 60 most closely associated with the selected item 62. Another context-based filter 130 can be applied to the group of network items 128, as appropriate (e.g., item-item relationships 50), resulting in the list of items 126 that are highly related to the selected item "I1" 62.

Hence, the item-based filtering illustrated in FIG. 9 first identifies the group of network users 60 having the highest relative user affinity values 56 for the selected available network item 62, and then identifies the network items 128 that have the highest relative item affinity values 54 for each of the group of users 60 most closely associated with the selected item 62. Hence, the item-based filtering illustrated in FIG. 9 can provide varying strengths of relationships between items. Consequently, the item-based filtering illustrated in FIG. 9 is distinct from conventional item-based collaborative filtering that rely on Boolean relationships between items, where relationships are expressed as an item-item matrix determining relationships between pairs of items (i.e., either there exists a relationship between the pair or there does not).

The processor circuit 22 also can execute the filter 124 of FIG. 8 in step 90 based on applying the presentation context provided by the related items 126 (e.g., performing an AND-based filtering between the personally interesting content 122 and the related items 126). The processor circuit 22 also can apply to the filter 124 in step 90 selected user preferences 134, for example the preferences specified in the user profile 32, age or content restrictions, scheduled preferences (e.g., preferred morning news shows), browsing history, and/or business rules, etc. Hence, the processor circuit 22 can output in step 92 the recommendation 132 of at least one new network item most preferred by the user "P1". The recommendation 132 can be implemented as a prioritized list or display of the new network items, or a presentation of a single new network item identified as the most likely preferred by the user 16. Hence, the recommendation 132 is equivalent to the recommendations 36 of FIG. 2. Hence, the processor circuit 22 can provide a new network item that most likely will be preferred by the identified user 16 and that is uniquely recommended based on the personal tastes of the user 16 as demonstrated by the socially relevant gestures 40 of the user 16.

According to example embodiments, socially collaborative filtering can be implemented to provide personalized recommendations to a user based on user personal tastes that can be passively detected based on detecting socially relevant gestures by the user. The personalized recommendations can be updated in response to each detected input by the user, further providing context-appropriate recommendations.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    identifying, by an apparatus, item affinity values for an identified user based on an accumulation of user selection inputs executed by the identified user within an input context of input options presented to the user and identifying respective available network items, the accumulation including an identification of the input options not having been selected by the identified user;
    determining by the apparatus an ordered list of network users ordered based on having a highest correlation of shared interests with the identified user in response to detecting the identified user is accessing the network to supply the user selection inputs, the ordered list of network users based on (1) identifying, from the available network items, an ordered list of preferred network items based on ordering the item affinity values according to highest relative item affinity values, and (2) generating the ordered list of network users based on ordering first network users, identified as providing highest relative user affinity values for each of the preferred network items, according to their respective user affinity values relative to the ordered list of preferred network items; and
    determining, by the apparatus, at least one of new network items most likely to be preferred by the identified user based on determining, from among network items not presented to the identified user, the preferred network items for each of the first network users in the ordered list of network users.

2. The method of claim 1, wherein the detecting includes detecting an access request by a user device, the method further comprising presenting by the apparatus at least one of the new network items to the user device.

3. The method of claim 1, further comprising generating by the apparatus, for each network user having accessed the network and including the identified user, the item affinity values for the available network items having been presented to the corresponding network user, each item affinity value identifying a corresponding affinity by the corresponding network user toward the corresponding available network item.

4. The method of claim 3, further comprising identifying, by the apparatus, the user affinity values based on identifying, for each network item, the network users owning highest relative item affinity values toward the corresponding network item, each user affinity value identifying the corresponding affinity by the corresponding network user toward the corresponding network item.

5. The method of claim 1, wherein the determining the group of network users includes filtering at least one of the group of preferred network items, the first network users, or the new network items according to a presentation context provided by the apparatus to the identified user in response to a prior request by the identified user relative to the detection that the identified user is accessing the network.

6. The method of claim 1, further comprising:
    filtering by the apparatus the new network items based on the user selection preferences; and presenting by the apparatus at least one of the new network items to a user device used by the identified user to access the network.

7. The method of claim 1, further comprising:
detecting by the apparatus that the identified user has selected one of the available network items;
determining by the apparatus a group of network items having a highest relation to the selected one available network item, based on (1) identifying a second group of the network users providing highest relative user affinity values for the selected one available network item, and (2) identifying network items having highest relative item affinity values for each of the second group of the network users;
filtering by the apparatus the new network items with the network items having the highest relation to the selected one available network item, and
presenting to the identified user the filtered new network items.

8. The method of claim 1, further comprising:
updating, by the apparatus, the item affinity values associated with the network items of input options having been presented to the user in response to each input by the user, including updating the input options having not been selected by the identified user; and
decreasing selected item affinity values in response to the input options having not been selected by the identified user.

9. An apparatus comprising:
a network interface circuit configured for determining an identified user is accessing a network, and in response outputting, via the network for presentation to the identified user, a recommendation of at least one of new network items most likely to be preferred by the identified user; and
a processor circuit configured for generating the recommendation of at least one of new network items in response to the identified user accessing the network, the processor circuit configured for generating the recommendation of at least one of new network items based on:
identifying item affinity values for the identified user based on an accumulation of user selection inputs executed by the identified user within an input context of input options presented to the user and identifying respective available network items, the accumulation including an identification of the input options not having been selected by the identified user;
determining an ordered list of network users ordered based on having a highest correlation of shared interests with the identified user in response to detecting the identified user is accessing the network to supply the user selection inputs, the ordered list of network users based on (1) identifying, from the available network items, an ordered list of preferred network items based on ordering the item affinity values according to highest relative item affinity values, and (2) generating the ordered list of network users based on ordering first network users, identified as providing highest relative user affinity values for each of the preferred network items, according to their respective user affinity values relative to the ordered list of preferred network items;
determining the new network items most likely to be preferred by the identified user based on determining, from among network items not presented to the identified user, the preferred network items for each of the first network users in the ordered list of network users.

10. The apparatus of claim 9, wherein the processor circuit is configured for generating, for each network user having accessed the network and including the identified user, the item affinity values for the available network items having been presented to the corresponding network user, each item affinity value identifying a corresponding affinity by the corresponding network user toward the corresponding available network item.

11. The apparatus of claim 10, wherein the processor circuit is configured for identifying the user affinity values based on identifying, for each network item, the network users owning highest relative item affinity values toward the corresponding network item, each user affinity value identifying the corresponding affinity by the corresponding network user toward the corresponding network item.

12. The apparatus of claim 9, wherein the processor circuit is configured for determining the group of network users based on filtering at least one of the group of preferred network items, the first network users, or the new network items according to a presentation context provided to the identified user in response to a prior request by the identified user relative to the detection that the identified user is accessing the network.

13. The apparatus of claim 9, wherein the processor circuit is configured for filtering the new network items based on the user selection preferences, the network interface circuit configured for outputting the new network items to a user device used by the identified user to access the network 14. The apparatus of claim 9, wherein the processor circuit is configured for:
detecting that the identified user has selected one of the available network items;
determining a group of network items having a highest relation to the selected one available network item, based on (1) identifying a second group of the network users providing highest relative user affinity values for the selected one available network item, and (2) identifying network items having highest relative item affinity values for each of the second group of the network users;
filtering the new network items with the network items having the highest relation to the selected one available network item, and
outputting for delivery via the network interface circuit to the identified user the filtered new network items.

15. The apparatus of claim 9, wherein the processor circuit is configured for:
updating the user selection preference in response to each input by the user, including updating the input options having not been selected by the identified user; and
decreasing selected item affinity values in response to the input options having not been selected by the identified user.

16. Logic encoded in one or more non-transitory tangible media for execution and when executed operable to:
identifying, by an apparatus, item affinity values for an identified user based on an accumulation of user selection inputs executed by the identified user within an input context of input options presented to the user and identifying respective available network items, the accumulation including an identification of the input options not having been selected by the identified user;
determining by the apparatus an ordered list of network users ordered based on having a highest correlation of shared interests with the identified user in response to detecting the identified user is accessing the network to supply the user selection inputs, the ordered list of network users based on (1) identifying, from the available network items, an ordered list of preferred network items based on ordering the item affinity values according to highest relative item affinity values, and (2) generating the ordered list of network users based on ordering first network users, identified as providing highest relative user affinity values for each of the preferred network items, according to their respective user affinity values relative to the ordered list of preferred network items; and determining, by the apparatus, at least one of new network items most likely to be preferred by the identified user based on determining, from among network items not presented to the identified user, the preferred network items for each of the first network users in the ordered list of network users.

17. The logic of claim 16, wherein the network items do not include any rating values.

18. The logic of claim 16, wherein the determining the group of network users includes filtering at least one of the group of preferred network items, the first network users, or the new network items according to a presentation context provided by the apparatus to the identified user in response to a prior request by the identified user relative to the detection that the identified user is accessing the network.

19. The method of claim 1, wherein the network items do not include any rating values.

20. The apparatus of claim 9, wherein the network items do not include any rating values.

* * * * *